United States Patent
Hwang

(10) Patent No.: US 9,882,813 B2
(45) Date of Patent: Jan. 30, 2018

(54) APPARATUS AND METHOD FOR FLOW CONTROL

(71) Applicant: SAMSUNG SDS CO., LTD., Seoul (KR)

(72) Inventor: Jin-Bum Hwang, Namyangju-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 230 days.

(21) Appl. No.: 14/928,195

(22) Filed: Oct. 30, 2015

(65) Prior Publication Data

US 2016/0127241 A1    May 5, 2016

(30) Foreign Application Priority Data

Oct. 31, 2014 (KR) .................. 10-2014-0149760

(51) Int. Cl.
| | |
|---|---|
| *H04L 12/803* | (2013.01) |
| *H04L 12/707* | (2013.01) |
| *H04L 12/721* | (2013.01) |
| *H04L 12/24* | (2006.01) |

(52) U.S. Cl.
CPC ........ *H04L 47/122* (2013.01); *H04L 41/0893* (2013.01); *H04L 45/22* (2013.01); *H04L 45/26* (2013.01)

(58) Field of Classification Search
CPC ... H04L 47/122; H04L 41/0893; H04L 45/22; H04L 45/26; H04L 12/4633; H04L 12/6418; H04L 49/70; H04L 41/5096; H04L 45/38; H04L 49/25; H04L 67/327; H04L 41/0816; H04L 41/083; H04L 41/12; H04L 45/02; H04L 45/306; H04B 10/27; H04J 14/021
See application file for complete search history.

(56) References Cited

U.S. PATENT DOCUMENTS

| | | | | |
|---|---|---|---|---|
| 7,136,359 | B1* | 11/2006 | Coile ................. | H04L 63/0236 370/248 |
| 7,792,065 | B2* | 9/2010 | Jepson ............. | H04L 29/06027 370/261 |
| 7,979,565 | B2* | 7/2011 | Leitheiser .......... | H04L 12/4641 370/409 |
| 8,130,747 | B2* | 3/2012 | Li ....................... | H04L 41/0893 370/351 |
| 8,938,553 | B2* | 1/2015 | Ly .......................... | H04L 41/00 709/233 |

(Continued)

*Primary Examiner* — Wutchung Chu
(74) *Attorney, Agent, or Firm* — Sughrue Mion, PLLC

(57) ABSTRACT

Disclosed are a flow control apparatus and method. An apparatus for performing flow control in a software defined network (SDN) environment according to an exemplary embodiment includes a message receiving unit configured to receive a first packet processing inquiry message including a packet from a first switch and a control unit configured to determine whether there is a second proxy connected with a second switch and matching a first proxy connected with the first switch in response to the first packet processing inquiry message, instruct the first switch to transmit the packet such that the packet passes through the first proxy when it is determined that there is a second proxy, and instruct the first switch to transmit the packet such that the packet bypasses the first proxy when it is determined that there is no second proxy.

23 Claims, 12 Drawing Sheets

(56) References Cited

U.S. PATENT DOCUMENTS

| | | | | |
|---|---|---|---|---|
| 9,450,836 B2* | 9/2016 | Hammer | | H04L 41/50 |
| 9,647,937 B1* | 5/2017 | Dukes | | H04L 45/64 |
| 9,699,034 B2* | 7/2017 | Lee | | H04L 41/12 |
| 2003/0005047 A1* | 1/2003 | Seki | | H04L 29/06 709/203 |
| 2005/0125553 A1* | 6/2005 | Wu | | H04W 4/02 709/233 |
| 2006/0212935 A1* | 9/2006 | Burman | | H04L 67/2814 726/12 |
| 2006/0248194 A1* | 11/2006 | Ly | | H04L 67/2814 709/226 |
| 2007/0283023 A1* | 12/2007 | Ly | | H04L 69/16 709/227 |
| 2008/0281908 A1* | 11/2008 | McCanne | | G06F 17/30156 709/203 |
| 2009/0157888 A1* | 6/2009 | Demmer | | H04W 4/02 709/229 |
| 2009/0248800 A1* | 10/2009 | Chu | | H04L 29/12216 709/204 |
| 2010/0250767 A1* | 9/2010 | Barreto | | H04L 69/16 709/231 |
| 2010/0250768 A1* | 9/2010 | Barreto | | H04L 49/90 709/231 |
| 2010/0250770 A1* | 9/2010 | Barreto | | H04L 49/90 709/231 |
| 2010/0318665 A1* | 12/2010 | Demmer | | H04L 41/12 709/227 |
| 2014/0052877 A1* | 2/2014 | Mao | | H04L 61/103 709/245 |
| 2014/0189093 A1* | 7/2014 | du Toit | | H04L 47/10 709/224 |
| 2014/0211661 A1* | 7/2014 | Gorkemli | | H04L 41/12 370/255 |
| 2014/0229944 A1* | 8/2014 | Wang | | G06F 9/5088 718/1 |
| 2014/0337500 A1* | 11/2014 | Lee | | H04L 41/12 709/223 |
| 2015/0058968 A1* | 2/2015 | Wang | | H04L 63/0281 726/12 |
| 2015/0381752 A1* | 12/2015 | Torres | | H04L 67/28 709/228 |
| 2016/0013985 A1* | 1/2016 | Reddy | | H04L 41/0896 726/4 |
| 2016/0072705 A1* | 3/2016 | Lee | | H04L 45/38 370/392 |
| 2016/0094650 A1* | 3/2016 | Garcia de Rio | | H04L 47/78 709/226 |
| 2016/0150043 A1* | 5/2016 | Petronic | | H04L 61/2546 709/220 |
| 2016/0164786 A1* | 6/2016 | Fukuda | | H04L 45/38 370/236 |
| 2016/0205071 A1* | 7/2016 | Cooper | | H04L 12/6418 726/1 |
| 2017/0026422 A1* | 1/2017 | Klein | | H04L 67/1021 |

\* cited by examiner

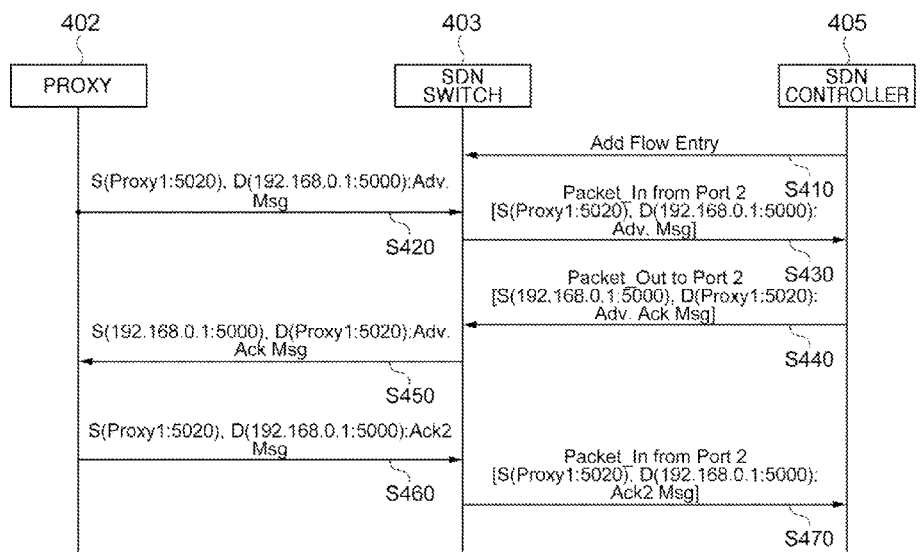

| NAT ARRANGEMENT | PACKET ADDRESS IN VIEW OF CSS (public or private) | | | | PACKET ADDRESS IN VIEW OF SSS (public or private) | | | |
|---|---|---|---|---|---|---|---|---|
| | LAN in (CLIENT→CSS→SERVER) | | WAN in (SERVER→CSS→CLIENT) | | WAN in (CLIENT→SSS→SERVER) | | LAN in (SERVER→SSS→CLIENT) | |
| | Source | Destination | Source | Destination | Source | Destination | Source | Destination |
| No NAT | Public | Public | Public | Public | Public | Public | Public | Public |
| Dual NAT | Private | Public | Public | Private | Public | Private | Private | Public |
| Client NAT | Private | Public | Public | Private | Public | Public | Public | Public |
| Server NAT | Public | Public | Public | Public | Public | Private | Private | Public |

| Switch Port | MAC src | MAC dst | Ether type | VLAN ID | VLAN priority | IP src | IP dst | IP proto | IP ToS | TCP/UDP src port | TCP/UDP dst port | Action |
|---|---|---|---|---|---|---|---|---|---|---|---|---|
| Port0 | * | * | * | * | * | C | S | * | * | * | * | Port1 |
| Port1 | * | * | * | * | * | C | S | * | * | * | * | Port2 |
| Port2 | * | * | * | * | * | C | S | * | * | * | * | Port3 |
| Port3 | * | * | * | * | * | C | S | * | * | * | * | Port10 |
| Port10 | * | * | * | * | * | S | C | * | * | * | * | Port3 |
| Port3 | * | * | * | * | * | S | C | * | * | * | * | Port2 |
| Port2 | * | * | * | * | * | S | C | * | * | * | * | Port1 |
| Port1 | * | * | * | * | * | S | C | * | * | * | * | Port0 |

| Switch Port | MAC src | MAC dst | Ether type | VLAN ID | VLAN priority | IP src | IP dst | IP proto | IP ToS | TCP/UDP src port | TCP/UDP dst port | Action |
|---|---|---|---|---|---|---|---|---|---|---|---|---|
| Port10 | * | * | * | * | * | C | S | * | * | * | * | Port3 |
| Port3 | * | * | * | * | * | C | S | * | * | * | * | Port2 |
| Port2 | * | * | * | * | * | C | S | * | * | * | * | Port1 |
| Port1 | * | * | * | * | * | C | S | * | * | * | * | Port0 |
| Port0 | * | * | * | * | * | S | C | * | * | * | * | Port1 |
| Port1 | * | * | * | * | * | S | C | * | * | * | * | Port2 |
| Port2 | * | * | * | * | * | S | C | * | * | * | * | Port3 |
| Port3 | * | * | * | * | * | S | C | * | * | * | * | Port10 |

APPARATUS AND METHOD FOR FLOW CONTROL

CROSS-REFERENCE TO RELATED APPLICATION

This application claims priority to and the benefit of Korean Patent Application No. 10-2014-0149760, filed on Oct. 31, 2014, the disclosure of which is incorporated herein by reference in its entirety.

BACKGROUND

1. Field

Disclosed embodiments relates to an apparatus and method for flow control, and more particularly, to a technique for controlling a flow in a software-defined network (SDN) environment.

2. Discussion of Related Art

Software-defined network (SDN) allows a flow (that is, a set of packets that have passed through a specific position on a network during a specific time) caused by data forwarding, which is processed with hardware, to be controlled with software. As the concept of SDN becomes commercially available, an SDN switch, which is implemented using a communication protocol (e.g., OpenFlow) that provides an interface with a network device for such data forwarding, has been developed.

An SDN switch may be utilized to control a flow according to a centralized policy. For example, network devices may be defined according to a policy for each flow. Accordingly, proxy devices that perform various functions on a network may be connected systematically, and also the network may be operated flexibly. In particular, network-function virtualization (NFV) technology is widespread, so that network devices are virtualized and virtual machines (VMs) are increasingly widely used. Thus, systematical connection among network devices is becoming more important.

As an example, an SDN switch may control a flow of compressed packets, which are not actually affected by deduplication, to pass through a proxy for transport acceleration and/or a proxy for Secure Sockets Layer (SSL) acceleration without passing through a proxy for deduplication.

Typically, proxy devices for performing the same function are provided to a client-side and a server-side in a path for packets between a client and a server to make a pair. For example, when a client-side proxy (CSP) uses a transport acceleration protocol to transport a flow, the flow should be processed using the same protocol by a server-side proxy (SSP) in order to achieve expected transport acceleration. Accordingly, there is a need to check whether a paired CCP and SSP are present in order to provide a service for the flow. This process is called proxy discovery. When there is an SSP matching a CSP, flow transport from the CSP to the SSP may be accelerated. When there is no SSP matching a CSP, the flow is delivered to a server without transport acceleration.

However, a conventional proxy discovery algorithm is not perfectly suitable for networks with various structures. Accordingly, there is still a need for proxy discovery for integratedly managing several network proxy devices connected to an SDN switch and a further need for an enhanced flow control technique.

SUMMARY

Conventionally, proxy discovery may be performed while a transmission control protocol (TCP) session is established between a client and a server in a specific network as follows. When the client transmits an SYN packet to the server, a client-side proxy (CSP) may intercept this packet and add its own packet to the packet (e.g., record the address in a TCP option filed of the packet). Subsequently, the CSP transmits the packet to the server. A server-side proxy (SSP) intercepts this packet to identify and store the address of CSP. Subsequently, the SSP removes the address from the packet and then transmits the original SYN packet to the server. The server receives the SYN packet and then transmits a SYN-ACK packet to the client. The SSP intercepts this packet and then sends an ACK packet to the server. The SSP adds its own address to the received SYN-ACK packet and then transmits the packet to the client. The CCP intercepts this packet to identify and store the address of the SSP. Subsequently, the CSP removes the address from the packet and then transmits the original SYN-ACK packet to the client. The client transmits an ACK packet to complete a TCP 3-way handshake. The CSP discards the ACK packet received from the client.

However, there are several limitations to the conventional proxy discovery.

For example, when a plurality of proxies in a network environment perform respective operations for proxy discovery, at least some of this operations may overlap with each other, and significant latency may be unnecessarily generated upon the flow transport. As the total number of proxies increases, the latency worsens. This may result in a timeout. Furthermore, when the proxies perform different proxy discovery mechanisms, the proxy discovery mechanisms may collide with each other and thus fail to achieve an accurate result although information to be used in the proxy discovery is additionally inserted into the packet itself.

In addition, when the paired CSP and SSP are not present, packets of the flow are transported in the bypass scheme without being processed by the proxy. However, the packets pass through all network stacks of the proxy. Accordingly, the bypass-type transport brings significant load to the proxy. In particular, when the plurality of proxies are implemented as virtual machines, the flow transported in the bypass scheme may be one of main causes of degradation of performance of all of the virtual machines.

Furthermore, when a network address translation (NAT) apparatus is disposed between the CSP and the SSP, the CSP and the SSP have difficulties in checking addresses of each other, and thus cannot properly perform proxy discovery properly.

Disclosed embodiments relate to an improved proxy discovery technique as compared to the related art and provide an apparatus and method for controlling a flow in a software defined network (SDN).

According to an aspect of the present disclosure, there is provided an apparatus for performing flow control in an SDN environment, the apparatus including a message receiving unit configured to receive a first packet processing inquiry message including a packet from a first switch, and a control unit configured to determine whether there is a second proxy connected to a second switch and matching a first proxy connected with the first switch in response to the first packet processing inquiry message, instruct the first switch to transmit the packet such that the packet passes through the first proxy when it is determined that there is a second proxy, and instruct the first switch to transmit the packet such that the packet bypasses the first proxy when it is determined that there is no second proxy.

The control unit may instruct the first switch to transmit a flow associated with the packet such that the flow bypasses the first proxy when it is determined that there is no second proxy.

When there is a second proxy but it is determined that there is no second proxy, the control unit may instruct the second switch to transmit the packet such that the packet bypasses the second proxy.

When there is a second proxy but it is determined that there is no second proxy, the control unit may instruct the second switch to transmit a flow associated with the packet such that the flow bypasses the second proxy.

The message receiving unit may receive a second packet processing inquiry message following the first packet processing inquiry message from the second switch, and the control unit may make a subsequent determination on whether the second proxy is present when a packet having the same source and the same destination as those of the packet included in the first packet processing inquiry message is included in the second packet processing inquiry message.

The control unit may calculate a hash value using at least one of an ID of the first switch and an ID of the first proxy, a source address of the packet, and a destination address of the packet and transmit the hash value to the first switch, the message receiving unit may receive a second packet processing inquiry message following the first packet processing inquiry message from the second switch, and the control unit may make a subsequent determination on whether the second proxy is present when the hash value is included in the second packet processing inquiry message.

The control unit may instruct the first switch to transmit another flow following the flow associated with the packet such that the other flow passes through the first proxy when a result of the subsequent determination is that the second proxy is present, and the control unit may instruct the second switch to transmit the other flow such that the other flow passes through the second proxy when a result of the subsequent determination is that the second proxy is present.

The control unit may instruct the first switch to transmit a flow associated with the packet such that the flow passes through the first proxy when it is determined that there is a second proxy.

The control unit may instruct the second switch to transmit the packet such that the packet passes through the second proxy when it is determined that there is a second proxy.

The control unit may instruct the second switch to transmit a flow associated with the packet such that the flow passes through the second proxy when it is determined that there is a second proxy.

When the packet is transmitted from a client to a server, the first switch may be a client-side switch, and the second switch may be a server-side switch, and when the packet is transmitted from the server to the client, the first switch may be a server-side switch, and the second switch may be a client-side switch.

Each of the first switch, the second switch, the first proxy, and the second proxy may be driven on a virtual machine.

According to another aspect of the present disclosure, there is provided a method of performing flow control in a software defined network (SDN) environment, the method including receiving a first packet processing inquiry message including a packet from a first switch, determining whether there is a second proxy connected with a second switch and matching a first proxy connected with the first switch in response to the first packet processing inquiry message, instructing the first switch to transmit the packet such that the packet passes through the first proxy when it is determined that there is a second proxy, and instructing the first switch to transmit the packet such that the packet bypasses the first proxy when it is determined that there is no second proxy.

The method may further include instructing the first switch to transmit a flow associated with the packet such that the flow bypasses the first proxy when it is determined that there is no second proxy.

When there is a second proxy but it is determined that there is no second proxy, the method may further include instructing the second switch to transmit the packet such that the packet bypasses the second proxy.

When there is a second proxy but it is determined that there is no second proxy, the method may further include instructing the second switch to transmit a flow associated with the packet such that the flow bypasses the second proxy.

The method may further include receiving a second packet processing inquiry message following the first packet processing inquiry message from the second switch, and making a subsequent determination on whether the second proxy is present when a packet having the same source and the same destination as those of the packet included in the first packet processing inquiry message is included in the second packet processing inquiry message.

The method may further include calculating a hash value using at least one of an ID of the first switch and an ID of the first proxy, a source address of the packet, and a destination address of the packet and transmitting the hash value to the first switch, receiving a second packet processing inquiry message following the first packet processing inquiry message from the second switch, and making a subsequent determination on whether the second proxy is present when the hash value is included in the second packet processing inquiry message.

The method may further include instructing the first switch to transmit another flow following the flow associated with the packet such that the other flow passes through the first proxy when a result of the subsequent determination is that the second proxy is present, and instructing the second switch to transmit the other flow such that the other flow passes through the second proxy when a result of the subsequent determination is that the second proxy is present.

The method may further include instructing the first switch to transmit a flow associated with the packet such that the flow passes through the first proxy when it is determined that there is a second proxy.

The method may further include instructing the second switch to transmit the packet such that the packet passes through the second proxy when it is determined that there is a second proxy.

The method may further include instructing the second switch to transmit a flow associated with the packet such that the flow passes through the second proxy when it is determined that there is a second proxy.

When the packet is transmitted from a client to a server, the first switch may be a client-side switch, and the second switch may be a server-side switch, and when the packet is transmitted from the server to the client, the first switch may be a server-side switch, and the second switch may be a client-side switch.

Each of the first switch, the second switch, the first proxy, and the second proxy may be driven on a virtual machine.

According to still another aspect of the present disclosure, there is provided a computer program stored in a storage medium and configured to execute the flow control method in combination of hardware.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which:

FIG. 4 is a view schematically showing a proxy registration process according to an exemplary embodiment;

FIG. 5 is a view showing a flow entry according to an exemplary embodiment;

FIG. 9 is a view for describing a relation between a layout and a packet address of a network address translation (NAT) in an SDN environment according to an exemplary embodiment;

FIG. 13 is a view showing a flow table that may be set in a client-side SDN switch according to an exemplary embodiment;

FIG. 14 is a view showing a flow table that may be set in a server-side SDN switch according to an exemplary embodiment.

DETAILED DESCRIPTION OF EXEMPLARY EMBODIMENTS

Hereinafter, embodiments of the present disclosure will be described in detail with reference to the accompanying drawings. The following detailed description will be provided for better understanding of a method, an apparatus, and/or a system that are disclosed in this specification. However, this is merely exemplary, and the present disclosure is not limited thereto.

In describing embodiments of the present disclosure, when it is determined that detailed description of known techniques associated with the present disclosure would unnecessarily obscure the gist of the present disclosure, the detailed description thereof will be omitted. Also, the terms described below are defined in consideration of the functions in the present disclosure, and thus may vary depending on a user, intention of an operator, or custom. Accordingly, the terms will be defined based on the whole specification. The terminology used herein is for the purpose of only describing embodiments of the present disclosure, and should not be restrictive. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figures 1, 2:
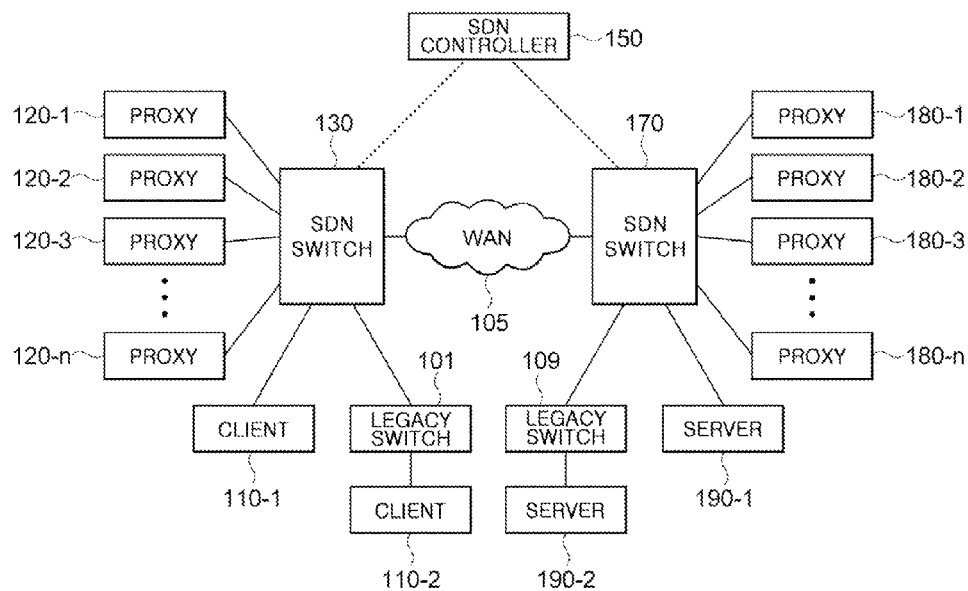
FIG. 1 is a view schematically showing a software-defined network (SDN) environment according to an exemplary embodiment.
FIG. 2 is a view showing an exemplary flow table that may be set in an SDN switch according to an OpenFlow protocol.

FIG. 1 is a view schematically showing a software-defined network (SDN) environment according to an exemplary embodiment.

As shown in FIG. 1, an exemplary SDN environment 100 includes at least one or more clients 110-1 and 110-2 and at least one or more servers 190-1 and 190-2. In addition, the SDN environment 100 further includes a client-side SDN switch (CSS) 130 and a server-side SDN switch (SSS) 170. The client 110-2 is connected with the CSS 130 via a legacy switch 101 while the client 110-1 is connected with the CSS 130 but not via a legacy switch. The server 190-2 is connected with the SSS 170 via a legacy switch 109 while the server 190-1 is connected with the SSS 170 but not via a legacy switch. In FIG. 1, the number of clients 110-1 and 110-2 included in the SDN environment 100 and the number of servers 190-1 and 190-2 included in the SDN environment 100 are merely illustrative. A different number of clients and/or a different number of servers may be included in the SDN environment 100. In addition, in FIG. 1, an additional CSS connected with at least one other client and/or an additional SSS connected with at least one other server may be included in the SDN environment 100. For convenience, any client in the SDN environment 100 is also referred to as the client 110, and any server in the SDN environment 100 is also referred to as the server 190.

In FIG. 1, communication between the CSS 130 and the client 110 may be performed over a local area network (LAN). In this case, the CSS 130 may use a LAN port to communicate with the client 110. Likewise, communication between the SSS 170 and the server 190 may be performed over the LAN. The SSS 170 may use the LAN port to communicate with the server 190. For convenience, such a LAN port is represented as "Port0."

In addition, the CSS 130 and the SSS 170 may communicate over a wide area network (WAN) (e.g., WAN 105). In this case, each of the CSS 130 and the SSS 170 may use a WAN port. For convenience, such a WAN port is represented as "Port1."

Furthermore, the SDN environment 100 may further include at least one or more client-side proxies (CSPs) 120-1, 120-2, 120-3, . . . , 120-n connected with the CSS 130 and at least one or more server-side proxies (SSPs) 180-1, 180-2, 180-3, . . . , 180-n connected with the SSS 170. However, in FIG. 1, the number of CSPs 120-1, 120-2, 120-3, . . . , 120-n included in the SDN environment 100 and the number of SSPs 180-1, 180-2, 180-3, . . . , 180-n included in the SDN environment 100 are merely illustrative. A different number of CSPs and/or a different number of SSPs may be included in the SDN environment 100. For convenience, any CSP in the SDN environment 100 is also referred to as the CSP 120, and any SSP in the SDN environment 100 is also referred to as the SSP 180.

In FIG. 1, the CSS 130 may use a specific port to communicate with the CSP 120, and the SSS 170 may use the same port to communicate with the SSP 180. For convenience, this port is represented as "Port2."

The CSP 120 may be one of various functional proxies such as a HyperText Transfer Protocol (HTTP) acceleration proxy, a deduplication proxy, an SSL acceleration proxy, and a transport acceleration proxy. Likewise, the SSP 180 may be one of various functional proxies such as an HTTP acceleration proxy, a deduplication proxy, an SSL acceleration proxy, and a transport acceleration proxy. Accordingly, the CSP 120 and the SSP 180 which are paired to function in cooperation with each other in order to provide a proxy service may be mutually matching proxies.

Additionally, the SDN environment 100 may further include an SDN controller 150 connected with the CSS 130 and the SSS 170. The SDN controller 150 may be connected directly with the CSS 130 and the SSS 170 and may be connected according to a Transmission Control Protocol/Internet Protocol (TCP/IP). For example, according to the OpenFlow protocol, the SDN controller 150 transmits a flow entry including information for controlling a packet flow to the SDN switch (e.g., CSS 130 and SSS 170) to provide an instruction to the SDN switch. The SDN switch performs a process such as packet transmission, modification, or disposal according to the instruction. The SDN switch records the received flow entries in its own flow table. For example, according to the OpenFlow protocol, the flow entry delivered to the SDN switch may include 12 field headers (that is, 12-tuple header) representing the following control information.

Switch Port: Port through which packet enters SDN switch
MAC src: Source MAC address
MAC dst: Destination MAC address
Ether type: Ethernet type
VLAN ID: Virtual LAN (VLAN) ID in IEEE 802.1Q header field
VLAN priority: Priority in VLAN in IEEE 802.1Q header field
IP src: Source IP address
IP dst: Destination IP address
IP proto: IP protocol number
IP ToS bits: IP service type
TCP/UDP src port: Source port
TCP/UDP dst port: Destination port When the packet matches information indicated by the above header fields, the SDN switch may process the packet in a predetermined scheme. A header field in which a wild card "*" is written denotes no matching condition added. In addition, the above flow entry may further include an action field indicating how to process the packet when the packet satisfies information designated by the header. That is, the aforementioned packet processing scheme is designated in the action filed. For example, the packet may be delivered to a path or port designated in the action field.

Furthermore, FIG. 2 shows an exemplary flow table that may be set in an SDN switch according to an OpenFlow protocol. The flow table 200 of FIG. 2 includes a flow entry 210 and a flow entry 220. A 12-tuple header and an action field of the flow entry 210 define a flow having a destination MAC address of "00:1F:." as being forwarded to "Port6," and a 12-tuple header and an action field of the flow entry 220 define a flow toward port 80 as being forwarded to "Port7."

At an initial stage, the flow table of the SDN switch may be empty. When a packet corresponding to a new flow enters the SDN switch, the SDN switch communicates with the SDN controller 150 to receive an instruction on how to process the flow. When the packet enters the SDN switch, the SDN switch checks its own flow table and forwards the packet when the flow table defines how to forward the packet. When the flow table does not define how to forward the packet, the SDN switch inquires a packet processing scheme of the SDN controller 150. According to the inquiry, the SDN controller 150 generates a flow entry for designating a packet processing scheme associated with a port to which the packet is to be forwarded and then responds to the SDN switch using the generated flow entry. After receiving the response, the SDN switch processes the packet in the designated packet processing scheme and records the flow entry in the flow table. Subsequently, when the packet of the same flow enters the SDN switch, the SDN switch processes the packet according to the flow entry.

Figure 3:
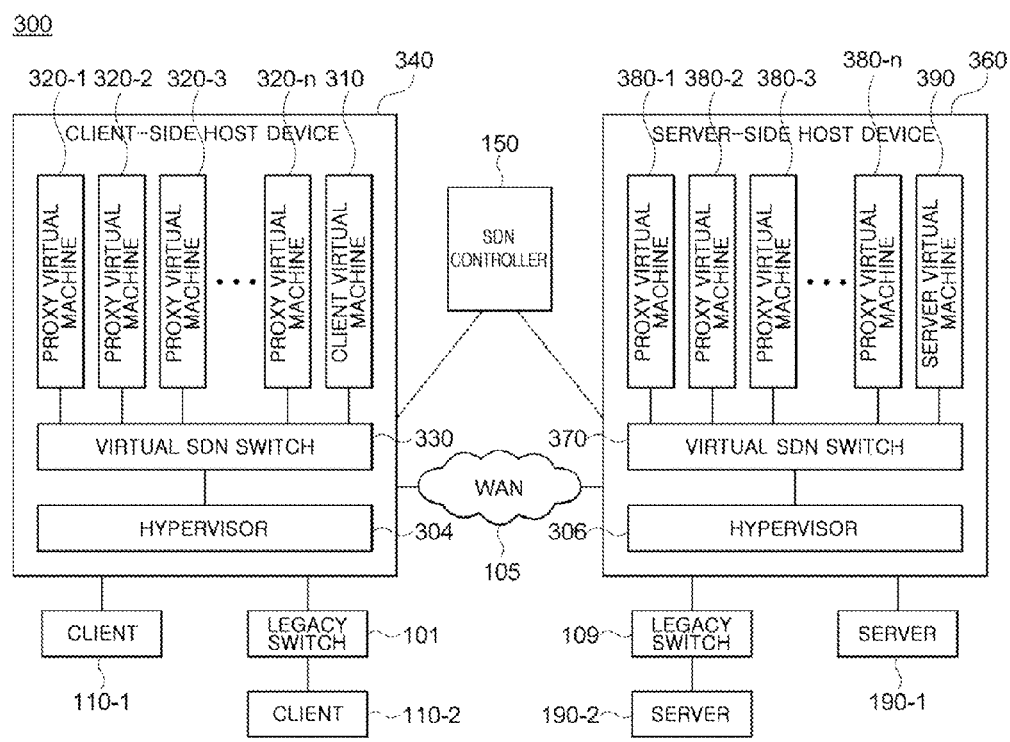
FIG. 3 is a view schematically showing an SDN environment according to an exemplary embodiment.

FIG. 3 is a view schematically showing an SDN environment according to an exemplary embodiment.

As shown in FIG. 3, an exemplary SDN environment 300 includes a client-side host device 340 and a server-side host device 360.

The client-side host device 340 includes a hypervisor 304. A virtual SDN switch 330, which is a virtual machine that performs an SDN switch function, is driven in a virtualization environment provided by the hypervisor 304. In addition, a client virtual machine 310 that performs a client function and at least one or more proxy virtual machines 320-1, 320-2, 320-3, . . . , 320-*n* that perform a proxy function are driven in such a virtualization environment. Furthermore, the virtual SDN switch 330 may be connected with at least one or more clients 110-1 and 110-2 (e.g., which may be implemented on an external host device) through the hypervisor 304.

Likewise, the server-side host device 360 includes a hypervisor 306. A virtual SDN switch 370, which is a virtual machine that performs an SDN switch function, is driven in a virtualization environment provided by the hypervisor 306. In addition, a server virtual machine 390 that performs a server function and at least one or more proxy virtual machines 380-1, 380-2, 380-3, . . . , 380-*n* that perform a proxy function are driven in such a virtualization environment. Furthermore, the server-side host device 360 may be connected with at least one or more servers 190-1 and 190-2 (e.g., which may be implemented on an external host device) through the hypervisor 306.

The virtual SDN switch 330 and the virtual SDN switch 370 may communicate over a WAN (e.g., WAN 105). In addition, the virtual SDN switch 330 and the virtual SDN switch 370 may be connected with an SDN controller 150.

When network devices (e.g., proxy devices) are implemented as respective virtual machines as shown in FIG. 3, each vendor can independently add a new virtual machine in order to apply a new function to the devices, additionally allocate resources to a virtual machine having a large load, and meet the needs of a user by adding a host device or enhancing the performance of the host device without replacing an existing device (that is, without stopping operation of the network).

Referring to FIG. 3 in addition to FIG. 1, the client virtual machine 310, the proxy virtual machines 320-1, 320-2, 320-3, . . . , 320-*n*, the virtual SDN switch 330, the virtual SDN switch 370, and the proxy virtual machines 380-1, 380-2, 380-3, . . . , 380-*n*, and the server virtual machine 390 may be virtual machines that perform the same functions as the client 110, the CSP 120, the CSS 130, the SSS 170, the SSP 180, and the server 190, respectively, and may be referred to as the client 110, the CSP 102, the CSS 130, the SSS 170, the SSP 180, and the server 190 in terms of implemented functionality, respectively. Accordingly, it should be noted that exemplary operations applied to the SDN environment 300 of FIG. 3, which will be discussed in the following description, may be performed in the SDN environment 100 of FIG. 1.

A flow control technique using the SDN controller 150 in the SDN environment (e.g., the SDN environment 100 or SDN environment 300) to allow a flow on which transport acceleration is performed by a proxy to pass through the proxy and to allow a flow on which transport acceleration is not performed by the proxy to bypass the proxy will be further described in detail. This technique may decrease a load to be borne by each proxy in order to process the packet. According to an exemplary embodiment, the flow control technique involves a proxy registration process, a proxy discovery process, and a proxy chaining process. For convenience of description, an operating environment in which an OpenFlow protocol is used in the proxy control technique will be mentioned in the following description. However, such an operating environment is merely illustrative.

Proxy Registration

Information regarding the proxy connected to the SDN switch is needed by the SDN controller 150 to perform proxy discovery. Accordingly, as shown in FIG. 4, an exemplary proxy registration process 400 may be performed.

The proxy registration process 400 of FIG. 4 includes operations performed by a proxy 402, an SDN switch 403, and an SDN controller 405. For example, the proxy 402 may be the CSP 120 or SSP 180, the SDN switch 403 may be the CSS 130 or SSS 170, and the SDN controller 405 may be the SDN controller 150.

First, when connection between the SDN controller 405 and the SDN switch 403 is established, the SDN controller 405 provides a flow entry for communication between the proxy 402 and the SDN controller 405 to the SDN switch 403 (S410). Such a flow entry may be used to deliver a packet from the proxy 402 to the SDN controller 405 via the SDN switch 403 according to the OpenFlow protocol. For convenience of description, the representation "S(X),D(Y): P" may be used to specify packet P and also source address X and destination address Y of packet P. The source address and the destination address may be represented in the format of "IPaddr:Port," and a part "IPaddr" and a part "Port" may refer to an IP address and a port, respectively.

For example, for a communication channel of the proxy 402, a flow entry 510 shown in FIG. 5 may be added to the flow table of the SDN switch 403. According to the added flow entry 510, when the proxy 402 transmits a UDP packet to a destination address of "192.168.0.1:5000" (that is, a destination IP address of "192.168.0.1" and a destination port of "5000") (S420), the SDN switch 403 delivers this packet to the SDN controller 405 according to the flow entry 510 (particularly, an action field) (S430). As such, since the proxy 402 may use the above predefined address to communicate with the SDN controller 405, an out-of-band connection with the SDN controller 405 is not established.

In this example, the packet transmitted from the proxy 402 may include a message (hereinafter, referred to as a proxy advertisement message) informing information about the proxy 402. In FIG. 4, this packet is represented as "Adv. Msg." Once the proxy 402 is connected to the SDN switch 403, the proxy 402 may transmit a packet including the proxy advertisement message to a predetermined address "192.168.0.1:5000" until a session with the SDN controller 405 is established. The proxy advertisement message may include the following information.

Type of corresponding proxy.
Version of corresponding proxy.
Controller channel address of corresponding proxy
Socket server address for communication between corresponding proxy and other proxy In particular, the controller channel address denotes an address that is bound in order to receive a message from the SDN controller 405. For example, the controller channel address of the proxy 402 may be "Proxy1:5020" represented as the source address of the proxy advertisement message in FIG. 4.

In addition, when the SDN switch 403 receives a packet "Adv. Msg" from the proxy 402 (e.g., through "Port2" as shown in FIG. 4), the SDN switch 403 may encode this packet into a predetermined Packet_In message suitable for the OpenFlow protocol to deliver the message to the SDN controller 405. After receiving the encoded message, the SDN controller 405 may extract the following information regarding the proxy 402 from the message and store the information.

ID of corresponding proxy
ID of SDN switch to which corresponding proxy is connected
Port number of SDN switch to which corresponding proxy is connected
Information included in proxy advertisement message of corresponding proxy Subsequently, the SDN controller 405 transmits an acknowledgement message (hereinafter, referred to as a "proxy advertisement acknowledgement message") for the proxy advertisement message (S440). To this end, as shown in FIG. 4, the SDN controller 405 may generate a packet (represented as "Adv. Ack Msg" in FIG. 4) having a controller channel address (e.g., "Proxy1:5020") in the proxy advertisement message as a destination address and a predefined address "192.168.0.1:5000" as a source address, and then encode this packet into a predetermined Packet_Out message suitable for the OpenFlow protocol to deliver the message to the SDN switch 403. This Packet_Out message may include information for instructing an internal packet "Adv. Ack Msg" to be transmitted from the SDN switch 403 to the proxy 402 (e.g., through "Port2" as shown in FIG. 4).

Subsequently, the SDN switch 403 transmits the packet "Adv. Ack Msg" in the received proxy advertisement acknowledgement message to a designated destination address (S450). After receiving the above packet, the proxy 402 transmits the acknowledgement message (hereinafter also referred to as a "final acknowledgement message") for the packet to a predefined address "192.168.0.1:5000" (S460). For example, the proxy 402 may transmit a packet represented as "S(Proxy1:5020),D(192.168.0.1:5000):Ack2 Msg" in FIG. 4. When receiving the packet "Ack2 Msg," the SDN switch 403 encodes this packet into a predetermined Packet_In message suitable for the OpenFlow protocol to transmit the message to the SDN controller 405.

As such, when the proxy registration process 400 is completed through a handshake for exchanging the proxy advertisement message, the proxy advertisement acknowledgement message, and the final acknowledge message, the SDN controller 405 may acquire information that the SDN switch 403 is connected with the proxy 402 (e.g., through "port2"). As a result, the SDN controller 150 may acquire information regarding the proxies (CSP 120 and SSP 180) and the SDN switches (CCS 130 and SSS 170), regardless of their presence in the SDN environment 100 or the SDN environment 300. For example, the SDN controller 150 may recognize which proxies are at the client 110 side and at the server 190 side. The SDN controller 150 may perform a proxy discovery process for determining via which proxies a packet flow from the client 110 should be served on the basis of the acquired information.

Proxy Discovery

When packet transport from the client 110 is started, a proxy discovery process needs to be performed. The proxy discovery process involves checking whether mutually matching proxies are present at the client side and server side in response to packet processing inquiry messages (e.g., Packet_In messages) delivered from the CSS 130 and the SSS 170 to the SDN controller 150 while packets flow upon initial transport.

In particular, at an initial stage, a flow entry for processing the flow would not be defined in the SDN switches 130 and 170. Accordingly, the CSS 130 may transmit a packet processing inquiry message to the SDN controller 150 to inquire about how to process the packets in the flow. The SDN controller 150 checks whether a proxy service for the flow is defined from a predetermined flow policy. When the flow is not a target of the proxy service, the SDN controller 150 transmits a flow entry to the CSS 130 and thus the CSS 130 allows the flow entry to not pass through, but to bypass any proxy. When a proxy service for the flow is defined, the SDN controller 150 may check which proxy is connected to the CSS 130. When it is confirmed that a proxy (e.g., CSP 120) associated with a defined proxy service is connected to the CSS 130, the SDN controller 150 checks whether a proxy (that is, a proxy matching that of the CSP 120 connected to the CSS 130) associated with the same proxy service is connected to the SSS 170. When it is confirmed that the matching proxy (e.g., SSP 180) is connected to the SSS 170, the SDN controller 150 generates a flow entry for chaining proxies from the CSS 130 to the SSS 170 to transmit the generated flow entry to the CSS 130 and the SSS 170. The order of passing the proxies between the CSS 130 and the SSS 170 may be checked from this flow entry. Flow steering is completed after the flow discovery.

Figure 6:
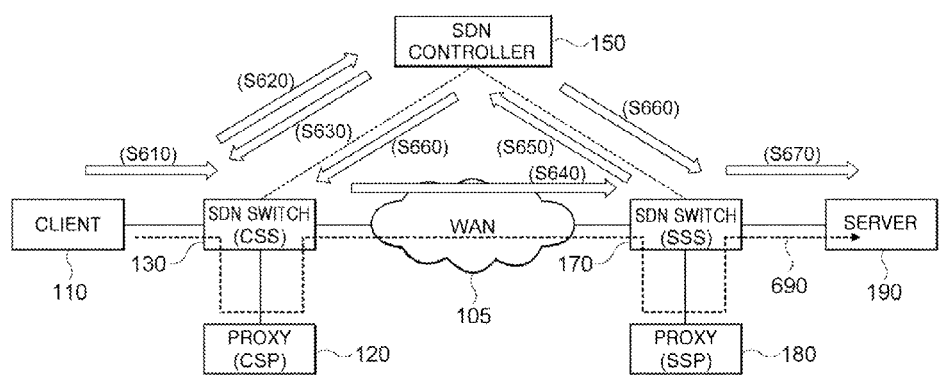
FIG. 6 is a view illustrating proxy discovery performed at an initial stage at which a flow entry is not set in both a client-side SDN switch and a server-side SDN switch according to an exemplary embodiment.

As a detailed example, it will be described with reference to FIG. 6 how the proxy discovery is performed at an initial stage at which a flow entry is not set in the CSS 130 and the SSS 170.

When a packet transmitted from the client 110 reaches the CSS (S610), the CSS 130 transports this packet to the SDN controller 150 (e.g., the packet is encoded into a predetermined Packet_In message and transported as a packet processing inquiry message) because the CSS 130 does not have a flow entry associated with the packet (S620). The SDN controller 150 may check which SDN switch and which proxy is connected with the destination address (e.g., an address of the server 190) of the packet. However, since the SDN controller 150 does not have information regarding such an SDN switch and proxy at an initial stage, the SDN controller 150 stores information in which the client 110 and the CSS 130 are mapped to each other first and then instructs the CSS 130 to allow the packet to bypass the CSP 120 and the SSP 180. Along with this instruction, the SDN controller 150 may transmit, to the CSS 130, a flow entry for transporting the packet flow from the CSS 130 to the SSS 170 but not via any proxy.

Subsequently, the CSS 130 transmits the packet according to the instruction of the SDN controller 150, and the transmitted packet reaches the SSS 170 on the way to the server 190 via the WAN 105 (S640). Since the SSS 170 also does not have the flow entry associated with the packet at an initial stage, the SSS 170 transports this packet to the SDN controller 140 (S650) (e.g., the packet is encoded into a predetermined Packet_In message and transmitted as a packet processing inquiry message) (S650). Thus, the SDN controller 150 may acquire the information in which the server 190 and the SSS 170 are mapped to each other and may also determine, from the source address of the packet, that the information in which the client 110 and the CSS 130 are mapped to each other is associated with this packet. In addition, through the aforementioned proxy registration process, the SDN controller 150 may identify a proxy connected with the CSS 130 and a proxy connected with the SSS 170. Accordingly, for this packet, the SDN controller 150 may check whether there are proxies (that is, mutually matching proxies) connected to provide a common proxy service among the proxy (e.g., CSP 120) connected with the CSS 130 and the proxy (e.g., SSP 180) connected with the SSS 170. When it is confirmed that there are mutually matching proxies (e.g., CSP 120 and SSP 180), the SDN controller 150 transmits flow entries for chaining the proxies such that another flow may be subsequently served from the client via the proxies. Accordingly, after the flow entry is set as above, another flow may be transmitted from the client 110 to the server 190 along a path (e.g., a path 689), which is not through the SDN controller 150 but through the mutually matching proxies. The SDN controller 150 instructs the SSS 170 to transport a previously received packet to the server 190 such that the packet bypasses the proxies (e.g., SSP 180) (S670).

Figure 7:
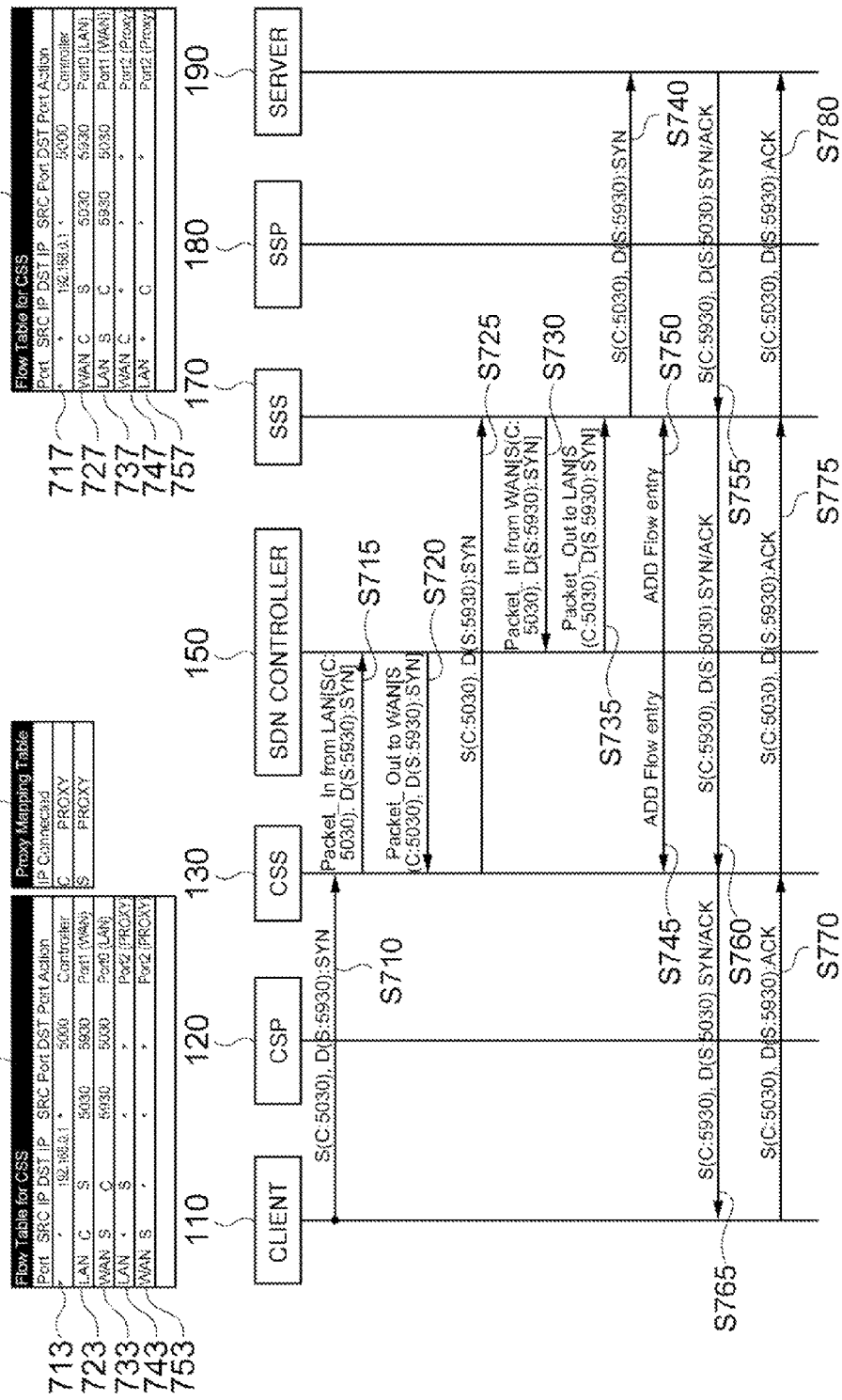
FIG. 7 is a view schematically showing a proxy discovery process according to an exemplary embodiment.

FIG. 7 schematically shows a proxy discovery process according to the OpenFlow protocol and flow tables of the CSS 130 and the SSS 170 when the CSP 120 and the SSP 180 match each other according to an exemplary embodiment.

In FIG. 7, a flow table 703 and a flow table 707 are stored in the CSS 130 and the SSS 170, respectively. In the proxy registration process, a flow entry 713 and a flow entry 717 are added to the flow table 703 and the flow table 707, respectively.

As shown in FIG. 7, it is assumed that an IP address and a port of the client are "C" and "5030," respectively, and an IP address and a port of the server 190 are "S" and "5930," respectively. When the client 110 transmits a packet represented as "S(C:5030),D(S:5930):SYN," this packet reaches the CSS 130 through the LAN port (S710). Since the flow table 703 of the CSS 130 does not include a flow entry for this packet, the CSS 130 encodes this packet into a Packet_In message to transport to the SDN controller 150 (S715).

In an initial stage, a proxy mapping table 705 of the SDN controller 150 is empty. Accordingly, the SDN controller 150 checks if the client 110 and the CSS 130 are mapped to each other, and then encodes the above "SYN" packet into a Packet_Out message such that the "SYN" packet is delivered from the CSS 130 through the WAN port without passing through any proxies. The Packet_Out message may include the "SYN" packet and an instruction to transport the "SYN" packet such that the "SYN" packet bypasses the proxies. Subsequently, the SDN controller 150 transmits this message to the CSS 130 (S720). Additionally, the SDN controller 150 may transmit, to the CSS 130, a flow entry for instructing that a corresponding flow bypass the proxies (CSP 120 and SSP 180). Thus, flow entries 723 and 733 may be added to the flow table 703.

When the CSS 130 receives the Packet_Out message and then delivers the "SYN" packet in the message through the WAN port, this packet reaches the SSS 170 (S725). Since the flow table 707 of the SSS 170 does not include a flow entry for this packet, the SSS 170 encodes this packet into a Packet_In message to transport this message to the SDN controller 150 (S730). The SDN controller 150 encodes the "SYN" packet into a Packet_Out message such that this packet is delivered from the SSS 170 through the LAN port to bypass the proxies, and then transmits this message to the SSS 170 (S735). In addition, the SDN controller 150 may transmit, to the SSS 170, a flow entry for instructing that a corresponding flow bypass the proxies (CSP 120 and SSP 180). Thus, flow entries 727 and 737 may be added to the flow table 707.

Furthermore, as described above, the SDN controller 150 may check that the CSP 120 connected with the CSS 130 and the SSP 180 connected with the SSS 170 match each other. Accordingly, the SDN controller 150 may display, in the proxy mapping table 705, that the client 110 and the server 190 are mapped to the proxies (CSP 120 and SSP 180) that perform a common transport acceleration function. For example, as shown in FIG. 7, the proxy mapping table 705 may map the IP address of the client 110 and the IP address of the server 190 to an indication "PROXY" that represents a common function of the CSP 120 and the SSP 180.

When the SSS 170 receives the Packet_Out message and then delivers the "SYN" packet in the message through the LAN port, this packet reaches the server 190 (S740).

Since it is confirmed that there are the mutually matching CSP 120 and SSP 180, the SDN controller 150 transmits, to the CSS 130, flow entries that allow another flow to subsequently pass through the CSP 120 (S745) and transmits, to the SSS 170, flow entries that allow the flow to pass through the SSP 180 (S750). Thus, flow entries 743 and 753 may be added to the flow table 703, and flow entries 747 and 757 may be added to the flow table 707.

After receiving the "SYN" packet, the server 190 transmits a packet of "S(S:5930),D(C:5030):SYN/ACK" through the LAN port in response to this packet (S755). When this "SYN/ACK" packet reaches the SSS 170, the SSS 170 delivers this packet through the WAN port according to the flow entry 737 of the flow table 707 (S760). This is because the "SYN/ACK" packet belongs to the same flow as that of the above-described "SYN" packet. When this "SYN/ACK" packet reaches the CSS 130 through the WAN port, the CSS 130 delivers this packet through the LAN port according to the flow entry 733 of the flow table 703 (S765).

After receiving the "SYN/ACK" packet, the client 110 transmits a packet of "S(C:5030),D(S:5930):ACK" through the LAN port in response to this packet (S770). When this "ACK" packet reaches the CSS 130, the CSS 130 delivers this packet through the WAN port according to the flow entry 723 of the flow table 703 (S775). This is also because the "ACK" packet belongs to the same flow as that of the above-described "SYN" packet and "SYN/ACK" packet. When this "ACK" packet reaches the SSS 170 through the WAN port, the SSS 170 delivers this packet through the LAN port according to the flow entry 727 of the flow table 707 (S780). When the delivered "ACK" packet reaches the server 190, a 3-way handshake is completed.

As another example, when the CSS 130 receives a packet from the client 110 and sends a packet processing inquiry message to the SDN controller 150, the SDN controller 150 may already have information that the server 190 is connected with the SSS 170. For example, when a previous packet was transmitted toward the server 190 through the SSS 170 before the above packet is transmitted from the client 110, the SSS 170 may have transmitted a packet processing inquiry message to the SDN controller 150 in response to the reception of the previous packet, and thus the SDN controller 150 may store information that the server 190 and the SSS 170 are mapped to each other.

In this case, in response to the reception of the packet processing inquiry message from the CSS 130, the SDN controller 150 may check the mutually matching proxies among the proxy (e.g., CSP 120) connected with the CSS 130 and the proxy (e.g., SSP 180) connected with the SSS 170. When it is confirmed that mutually matching proxies (e.g., CSP 120 and SSP 180) are present, the SDN controller 150 may instruct the CSS 130 and the SSS 170 to instantly serve the current packet flow via the proxies. To this end, the SDN controller 150 may transmit flow entries obtained by chaining the proxies to the CSS 130 and the SSS 170.

Figure 8:
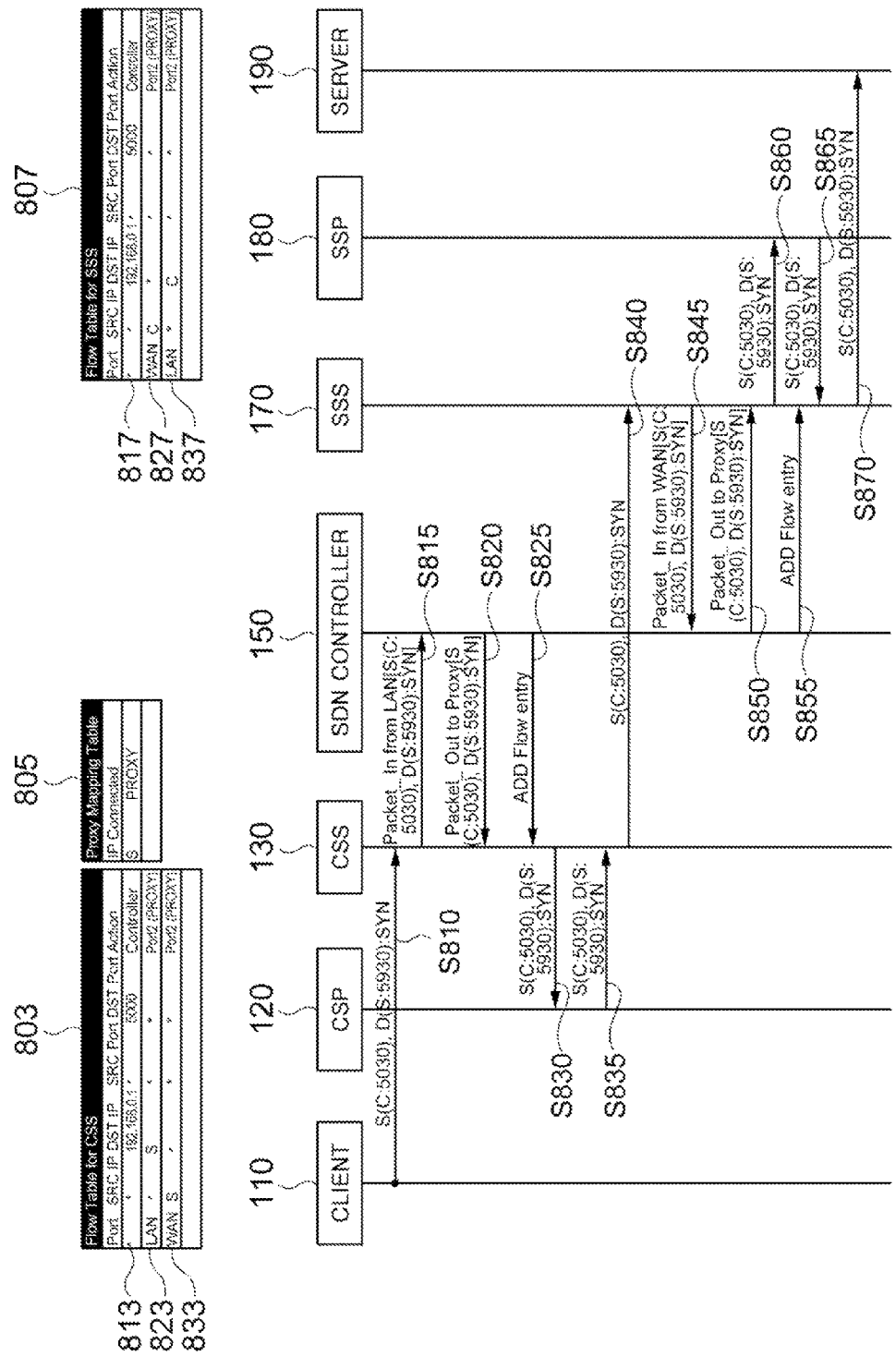
FIG. 8 is a view schematically showing a proxy discovery process according to an exemplary embodiment.

FIG. 8 schematically shows a proxy discovery process according to the OpenFlow protocol and flow tables of the CSS 130 and the SSS 170 when the CSP 120 and the SSP 180 match each other according to an exemplary embodiment.

In FIG. 8, a flow table 803 and a flow table 807 are stored in the CSS 130 and the SSS 170, respectively. In the proxy registration process, a flow entry 813 and a flow entry 817 are added to the flow table 803 and the flow table 807, respectively.

When the client 110 transmits a packet represented as "S(C:5030),D(S:5930):SYN," this packet reaches the CSS 130 through the LAN port (S810). Since the flow table 803 of the CSS 130 does not include a flow entry for this packet, the CSS 130 encodes this code into a Packet_In message to transport this message to the SDN controller 150 (S815).

However, in contrast to the example described with reference to FIG. 7, the IP address of the server 190 is mapped to an indication of "PROXY" that represents a function of the SSP 180 in a proxy mapping table 805 of the SDN controller 150. Accordingly, the SDN controller 150 may check that the CSP 120 connected with the CSS 130 and the SSP 180 connected with the SSS 170 match each other.

Since it is confirmed that the CSP 120 and the SSP 180 match each other, the SDN controller 150 encodes the above "SYN" packet into a Packet_Out message such that the "SYN" packet is delivered from the CSS 130 through "Port2" to pass through the CSP 120. The Packet_Out message may include the "SYN" packet and an instruction to transport the "SYN" packet such that the "SYN" packet passes through the CSP 120. Subsequently, the SDN controller 150 transmits this message to the CSS 130 (S820). In addition, the SDN controller 150 may transmit, to the CSS 130, flow entries that allow a flow between the CSS 130 and the SSS 170 to pass through the CSP 120 (S825). Thus, flow entries 823 and 833 may be added to the flow table 803.

When the CSS 130 receives the Packet_Out message and then delivers the "SYN" packet through "Port2," this packet reaches the CSP 120 (S830). When the CSP 120 transmits the packet, this packet reaches the SSS 170 via the CSS 130 (S840).

Yet, a flow entry for designating a scheme for processing this "SYN" packet may not be included in the flow table 807 of the SSS 170. Accordingly, the SSS 170 encodes this packet into a Packet_In message to transport this message to the SDN controller 150 (S845). The SDN controller 150 encodes the above "SYN" packet into the Packet_Out message such that the "SYN" packet is delivered from the CSS 130 through "Port2" to pass through the SSP 180. The Packet_Out message may include the "SYN" packet and an instruction to transport the "SYN" packet such that the "SYN" packet passes through the SSP 180. Subsequently, the SDN controller 150 transmits this message to the SSS 170 (S850). In addition, the SDN controller 150 may transmit, to the SSS 170, flow entries that allow a flow between the CSS 130 and the SSS 170 to pass through the SSP 180 (S855). Thus, flow entries 827 and 837 may be added to the flow table 807.

When the SSS 170 receives the Packet_Out message and then delivers the "SYN" packet through "Port2," this packet reaches the SSP 180 (S860). When the SSP 180 transmits the packet, this packet passes through the SSS 170 (S865) and reaches the server 190 (S870).

Considerations for NAT Arrangement

According to some embodiments, a NAT device may be disposed between the CSS 130 and the SSS 170. In this case, as described above, the CSS 130 may encode a packet transmitted from the client into a Packet_In message and transmit this message to the SDN controller 150 as a packet processing inquiry message. However, in the packet processing inquiry message of the CSS 130, a private address (that is, a non-NAT-converted address) of the client 110 is recorded as a source address, and a public address of the server 190 is recorded as a destination address. In addition, as aforementioned, the SSS 170 may encode the packet into the Packet_In message and transmit this message to the SDN controller 150 as a packet processing inquiry message. However, in the packet processing inquiry message of the SSS 170, a public address (that is, a NAT-converted address) of the client 110 is recorded as a source address, and a private address of the server 190 is recorded as a destination address. However, the SDN controller 150 has information regarding the mapping between the SSS 170 and the server 190 on the basis of the private address of the server 190. Accordingly, regardless of whether and how the NAT is arranged, an additional mechanism may be employed in order for the SDN controller 150 to perform the proxy discovery process.

Referring to a table 900 of FIG. 9, it can be seen whether addresses in a packet flowing into the CSS 130 and addresses in a packet flowing into the SSS 170 are private addresses or public addresses according to the arrangement of the NAT. As described in a column 910 of FIG. 9, (i) the NAT may be disposed neither at the client 110 side nor at the server 190 side ("No NAT"), (ii) the NAT may be disposed at both the client 110 side and the server 190 side (("Dual NAT"), (iii) the NAT may be disposed only at the client 110 side ("Client NAT"), and (iv) the NAT may be disposed only at the server 190 side ("Server NAT"). At the client 110 side, a destination address of a packet flowing into the CSS 130 through the LAN port is always a public address (see a column 930 of FIG. 9), and a source address of a packet flowing into the CSS 130 through the WAN port is always a public address (see a column 940 of FIG. 9), regardless of the NAT arrangement. Similarly, a destination address of a packet flowing into the SSS 170 through the LAN port is always a public address (see a column 990 of FIG. 9), and a source address of a packet flowing into the SSS 170 through the WAN port is always a public address (see a column 960 of FIG. 9), regardless of the NAT arrangement. On the contrary, a source address of a packet flowing in the CSS 130 through the LAN port, a destination address of a packet flowing in the CSS 130 through the WAN port, a destination address of a packet flowing in the SSS 170 through the WAN port, and a source address of a packet flowing in the SSS 170 through the LAN port may be private addresses or public addresses depending on the NAT arrangement (see columns 920, 950, 970, and 980 of FIG. 9).

In view of this, the SDN controller 150 maintains an address map for a public address (hereinafter referred to as a "public address map") and inserts a hash value into a packet in a Packet_In message received from the CSS 130. Such a hash value may be recorded in the public address map, and thus the public address map may be considered as a hash table.

A hash value to be added may be a result obtained by performing a specific hash algorithm (e.g., an MD5 algorithm) using a source address and a destination address of the packet as factors. In particular, the private address may be the same in different LANs, and the above hash algorithm may take an ID of the CSS 130 and/or an ID of the CSP 120 as additional factors. Although a packet flowing through the Packet_In message from the CSS 130 is the same as a packet flowing through a Packet_In message from the SSS 170, the two packets become to have different source addresses and/or different destination addresses due to the NAT conversion, the SDN controller 150 may recognize that the two packets have the same source and the same destination by adding such a hash value.

Figure 10:
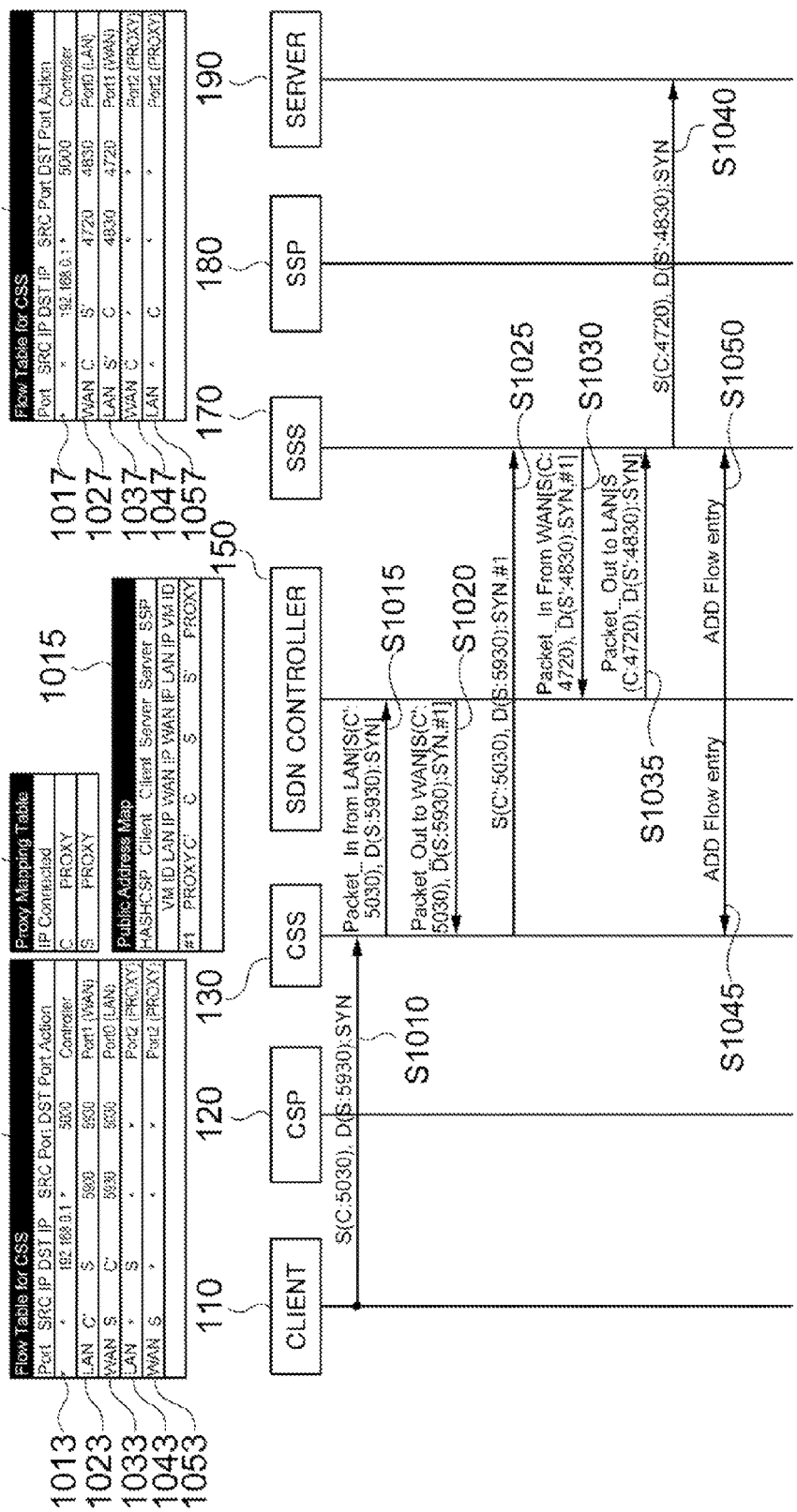
FIG. 10 is a view schematically showing a proxy discovery process according to an exemplary embodiment.

FIG. 10 schematically shows a proxy discovery process according to the OpenFlow protocol and flow tables of the CSS 130 and the SSS 170 when the CSP 120 and the SSP 180 match each other according to an exemplary embodiment.

In FIG. 10, a flow table 1003 and a flow table 1007 are stored in the CSS 130 and the SSS 170, respectively. In the proxy registration process, a flow entry 1013 and a flow entry 1017 are added to the flow table 1003 and the flow table 1007, respectively.

Referring to FIG. 10, when the client 110 transmits a packet represented as "S(C':5030),D(S:5930):SYN," this packet reaches the CSS 130 through the LAN port (S1010). Here, "C':5030" is a private address of the client 110, and "S:5930" is a public address of the server 190. Since the flow table 1003 of the CSS 130 does not include a flow entry for this packet, the CSS 130 encodes this packet into a Packet_In message to transport this message to the SDN controller 150 (S1015).

In an initial stage, a proxy mapping table 1005 of the SDN controller 150 is empty. Accordingly, the SDN controller 150 encodes the above "SYN" packet into a Packet_Out message such that the "SYN" packet is delivered from the CSS 130 through the WAN port to pass through no proxies. In particular, the SDN controller 150 may find a hash value from the source address and destination address of the above packet and the ID of the CSS 130 and may insert this hash value into the "SYN" packet in the Packet_Out message. As shown in FIG. 10, the calculated hash value may be represented as "#1," and the "SYN" packet to which the hash value is inserted may be represented as "S(C':5030),D(S: 5930):SYN,#1." In addition, the SDN controller 150 may map the ID of the CSS 130 or the ID of the CSP 120, a private IP address of the client 110 and a public IP address of the server 190 to a hash value "#1" and may display a result of the mapping in a public address map 1015 of the SDN controller 150.

Subsequently, the SDN controller 150 transmits this message to the CSS 130 (S1020). Additionally, the SDN controller 150 may transmit, to the CSS 130, a flow entry for instructing that a corresponding flow bypass the proxies (CSP 120 and SSP 180). Thus, flow entries 1023 and 1033 may be added to the flow table 1003.

When the CSS 130 receives the Packet_Out message and then delivers the "SYN" packet in the message through the WAN port, this packet reaches the SSS 170 (S1025). However, in contrast to the example described with reference to FIG. 7, the source address and destination address of the "SYN" packet received by the SSS 170 are corrected through the NAT conversion. For example, as shown in FIG. 10, this packet may be represented as "S(C:4720),D(S': 4830):SYN,#1." Here, "C:4720" is a public address of the client 110, and "S':4830" is a private address of the server 190.

Since the flow table 1007 of the SSS 170 does not include a flow entry for this packet, the SSS 170 encodes this packet into a Packet_In message to transport this message to the SDN controller 150 (S1030).

The SDN controller 150 may use the hash value in the "SYN" packet to check that a packet "S(C':5030),D(S: 5930):SYN,#1" and a packet "S(C:4720),D(S':4830):SYN, #1" have the same source and the same destination. Accordingly, as described above, the SDN controller 150 may check that the CSP 120 connected with the CSS 130 and the SSP 180 connected with the SSS 170 match each other. Moreover, the SDN controller 150 may display, in the mapping table 1005, that the public IP address of the client 110 and the public IP address of the server 190 are mapped to an indication "PROXY" that represents a common function of the CSP 120 and the SSP 180. In addition, the SDN controller 150 may map the public ID address of the client 110 and the private IP address of the server 190 to the hash value "#1" and may display a result of the mapping in the public address map 1015.

In addition, after the SDN controller 150 deletes the hash value from the "SYN" packet having the NAT-converted address, the SDN controller 150 encodes the "SYN" packet into a Packet_Out message such that this packet is delivered from the SSS 170 through the LAN port to bypass the proxies, and then transmits this message to the SSS 170 (S1035). Additionally, the SDN controller 150 may transmit, to the SSS 170, a flow entry for instructing that a corresponding flow bypass the proxies (CSP 120 and SSP 180). Thus, flow entries 1027 and 1037 may be added to the flow table 1007.

When the SSS 170 receives the Packet_Out message and then delivers the "SYN" packet in the message through the LAN port, this packet reaches the server 190 (S1040).

Since it is confirmed that there are the mutually matching CSP 120 and SSP 180, the SDN controller 150 transmits, to the CSS 130, flow entries that allow another flow to subsequently pass through the CSP 120 (S1045) and transmits, to the SSS 170, flow entries that allow the flow to pass through the SSP 180 (S1050). Thus, flow entries 1043 and 1053 may be added to the flow table 1003, and flow entries 1047 and 1057 may be added to the flow table 1007.

Figure 11:
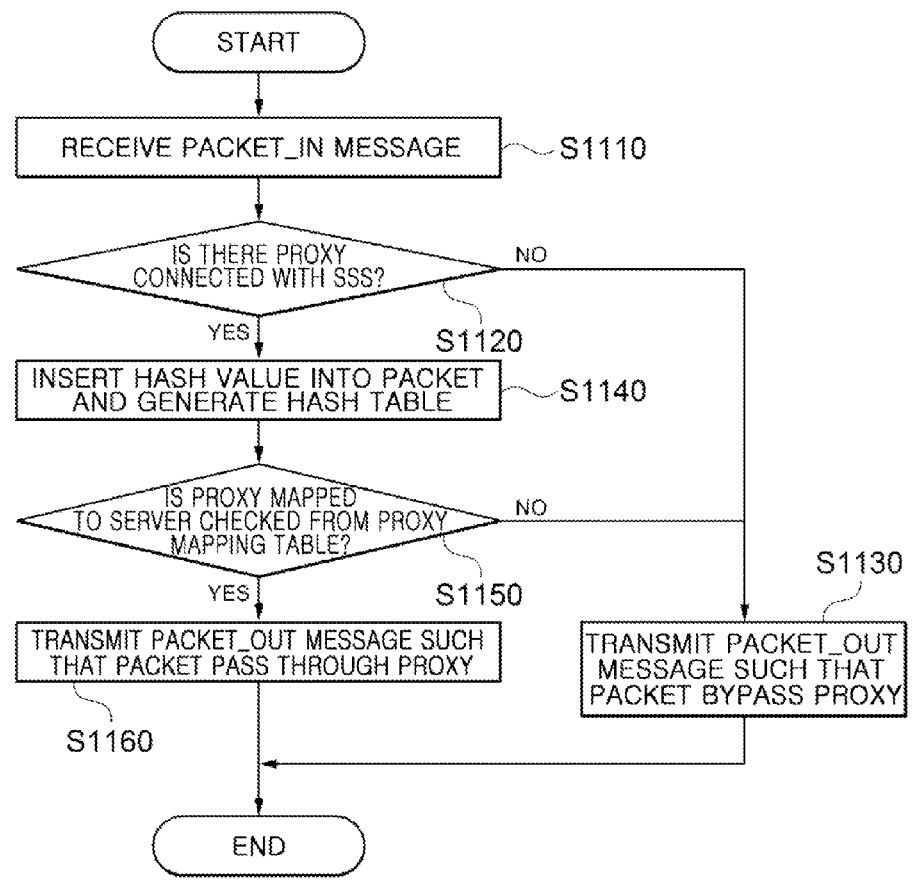
FIG. 11 is a flowchart illustrating a flow control process performed by an SDN controller according to an exemplary embodiment.

FIG. 11 is a flowchart illustrating a flow control process 1100 that the SDN controller 150 performs after receiving a Packet_In message from the CSS 130 according to an exemplary embodiment.

After a starting operation, an exemplary flow control process 1100 proceeds to S1110. In S1110, the SDN controller 150 receives a Packet_In message obtained by encoding a packet originating from the LAN port from the CSS 130. In S1120, the SDN controller 150 determines whether there is a proxy connected with the CSS 130.

When it is determined that there is no proxy connected with the CSS 130, the SDN controller 150 encodes a packet in the Packet_In message into a Packet_Out message such that the packet bypasses the proxy, and transmits this message (S1130). Additionally, the SDN controller 150 may transmit, to the CSS 130, a flow entry for instructing that a corresponding flow bypass the proxy (e.g., CSP 120). Furthermore, the common address map of the SDN controller 150 may further include an additional field (hereinafter also referred to as an "acceleration field") indicating the presence of acceleration, and the SDN controller 150 may set the acceleration field to a false value. Subsequently, the flow control process 1100 ends.

When it is determined that there is a proxy connected with the CSS 130, the SDN controller 150 may insert a hash value (e.g., "#1") into the packet in the Packet_In message, and generate a hash table by displaying the inserted hash value in the common address map of the SDN controller 150 (S1140). In the common address map, the hash value may be mapped to the ID of the CSS 130 or the ID of the CSP 120, a private IP address of the client 110, and a public IP address of the server 190.

In S1150, the SDN controller 150 checks, from it own proxy mapping table, whether there is a proxy mapped to the server 190. When it is confirmed that there is no proxy mapped to the server 190, the flow control process 110 proceeds to S1130. When it is confirmed that there is a proxy connected with the server 190, the SDN controller 150 encodes a packet in the Packet_In message into a Packet_Out message such that the packet passes through the proxy, and transmits this message (S1160). Additionally, the SDN controller 150 may transmit, to the CSS 130, a flow entry for instructing that a corresponding flow receive a proxy service. Furthermore, the SDN controller 150 may set the acceleration field of its own public address map to a true value. Subsequently, the flow control process 1100 ends.

Figure 12:
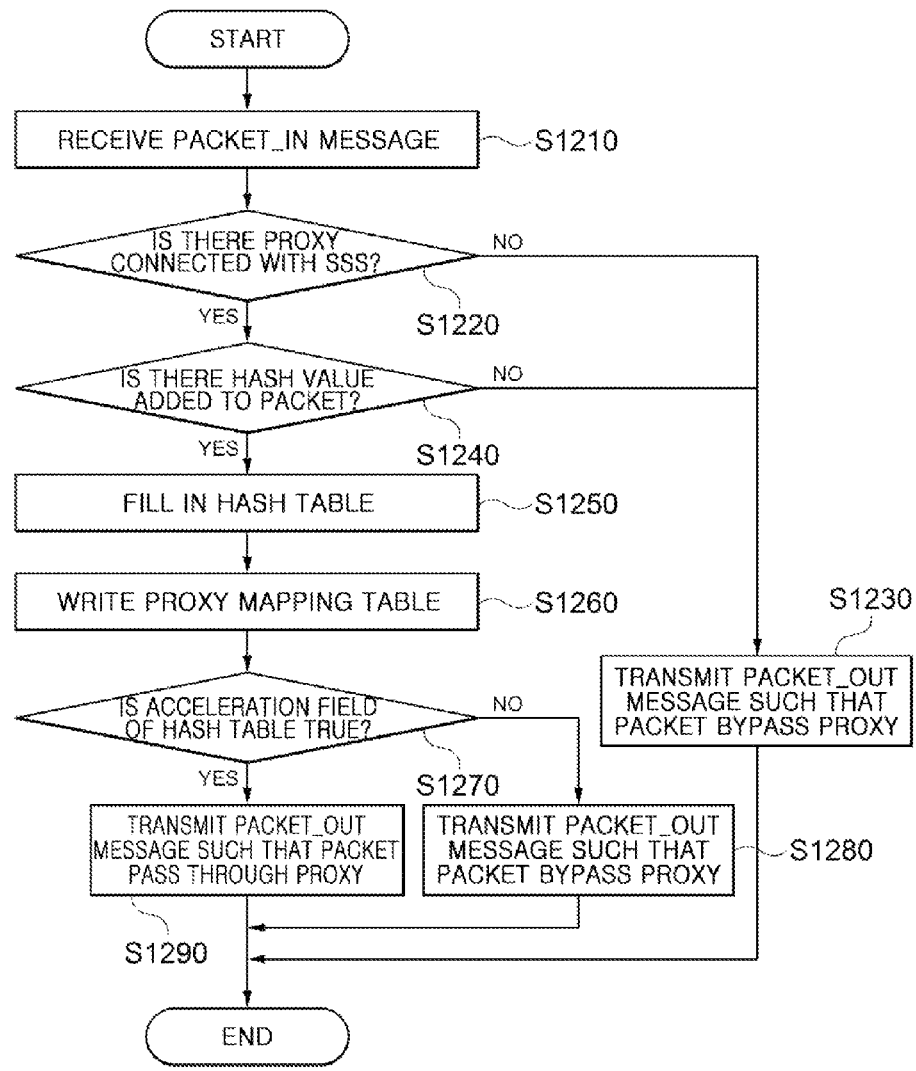
FIG. 12 is a flowchart illustrating a flow control process performed by an SDN controller according to an exemplary embodiment.

FIG. 12 is a flowchart illustrating a flow control process 1200 that the SDN controller 150 performs after receiving a Packet_In message from the SSS 170 according to an exemplary embodiment.

After a starting operation, an exemplary flow control process 1200 proceeds to S1210. In S1210, the SDN controller 150 receives a Packet_In message obtained by encoding a packet originating from the WAN port from the SSS 170. In S1220, the SDN controller 150 determines whether there is a proxy connected with the SSS 170.

When it is determined that there is no proxy connected with the SSS 170, the SDN controller 150 encodes a packet in the Packet_In message into a Packet_Out message such that the packet bypasses the proxy, and transmits this message (S1230). Additionally, the SDN controller 150 may transmit, to the SSS 170, a flow entry for instructing that a corresponding flow bypass the proxy (e.g., SSP 180). Subsequently, the flow control process 1100 ends.

When it is determined that there is a proxy connected with the CSS 130, the SDN controller 150 determines whether there is an inserted hash value (e.g., "#1") in the packet of the Packet_In message (S1240). When it is determined that there is no hash value in the packet, the flow control process 1100 proceeds to S1230.

When it is determined that there is a hash value in the packet, the SDN controller 150 fills in empty information in the hash table (that is, the public address map of the SDN controller 150) (S1250). For example, the SDN controller 150 may map the public ID address of the client 110 and the private IP address of the server 190 to the hash value and may display a result of the mapping in the public address map.

In S1260, the SDN controller 150 writes its own proxy mapping table. For example, the SDN controller 150 may display, in the mapping table, that the public IP address of the client 110 and the public IP address of the server 190 are mapped to an indication "PROXY" that represents a common function of the CSP 120 and the SSP 180.

In S1270, the SDN controller 150 checks whether the acceleration field of its own hash table has a true value.

When the acceleration field has a false value, the SDN controller 150 encodes a packet in the Packet_In message into a Packet_Out message such that the packet bypasses the proxy, and transmits this message (S1280). Additionally, the SDN controller 150 may transmit, to the CSS 130 and the SSS 170, a flow entry for instructing that another subsequent flow receive a proxy service. Subsequently, the flow control process 1100 ends.

When the acceleration field has a true value, the SDN controller 150 encodes a packet in the Packet_In message into a Packet_Out message such that the packet passes through the proxy, and transmits this message (S1290). Additionally, the SDN controller 150 may transmit, to the SSS 170, a flow entry for instructing that a corresponding flow receive a proxy service. Subsequently, the flow control process 1200 ends.

Proxy Chaining

When there are a plurality of proxies in an SDN environment, the SDN controller 150 may display an order of proxies in flow tables of the CSS 130 and the SSS 170 such that a flow passes through the proxies in the CSS 130 and the SSS 170 in the order. For example, the LAN port and the WAN port of each of the CSS 130 and the SSS 170 are "Port0" and "Port10," respectively. A first proxy, a second proxy, and a third proxy are connected through "Port1," "Port2," and "Port3," respectively. In this case, in order to instruct the CSS 130 and the SSS 170 to transport a flow from the client 110 having an IP address of "C" to the server 190 having an IP address of "S" such that the flow sequentially passes through the first proxy, the second proxy, and the third proxy, the SDN controller 150 may set a flow table 1300 shown in FIG. 13 and a flow table 1400 shown in FIG. 14 in the CSS 130 and the SSS 170, respectively.

Figure 15:
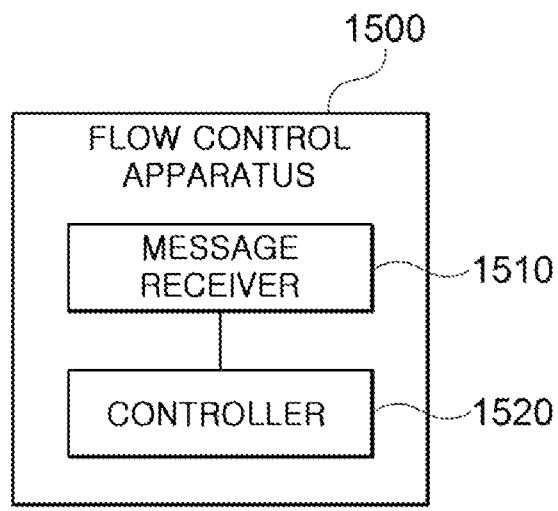
FIG. 15 is a block diagram showing an apparatus for performing flow control in an SDN environment according to an exemplary embodiment.

FIG. 15 is a block diagram showing an apparatus for performing flow control in an SDN environment according to an exemplary embodiment.

As shown in FIG. 15, an exemplary flow control apparatus 1500 includes a message receiver 1510 and a controller 1520. For example, the flow control apparatus 1500 may implement the SDN controller 150 included in a computing apparatus that can be disposed in the SDN environment. The computing apparatus may include a computer-readable storage medium such as at least one processor and a memory that is accessible by the processor. The computer-readable storage medium may be disposed inside or outside the processor, and may be connected with the processor using well known means. A computer executable instruction may be stored in the computer-readable storing medium. The processor may execute an instruction stored in the computer-readable storage medium. When such an instruction is executed by the processor, the instruction may allow the computing apparatus to perform at least some operations of the above-described SDN controller 150. In addition, the computing apparatus may further include an interface device configured to support input/output and/or communication between the computing apparatus and at least one external device, and may be connected with the external device (e.g., the client-side host device 340 and the server-side host device 360) through the interface device. Thus, the message receiver 1510 and the controller 1520 of the flow control apparatus 1500 may be implemented with hardware.

Modules of the flow control apparatus 1500 will be described in more detail with reference to FIG. 15.

The message receiver 1510 may receive a first packet processing inquiry message (e.g., Packet_In message) including a packet from a first switch. In addition, the message receiver 1510 may receive a second packet processing inquiry message (e.g., Packet_In message) following the first packet processing inquiry message from the second switch. For example, when a packet is transmitted from the client 110 to the server 190, the first switch is the CSS 130, and the second switch is the SSS 170. As another example, when a packet is transmitted from the server 190 to the client 110, the first switch is the SSS 170, and the second switch is the CSS 130.

Through the proxy registration process, the controller 1520 may identify at least one proxy (e.g., a first proxy) connected with the first switch and at least one proxy (e.g., a second proxy) connected with the second switch. Accordingly, the controller 1520 may maintain information regarding the proxy connected with the first switch and the proxy connected with the second switch. As mentioned above, the switches and proxies in the SDN environment may be driven on a separate virtual machine.

In response to the first packet processing inquiry message, the controller 1520 may determine whether there is a proxy connected with the second switch and matching the proxy (e.g., the first proxy) connected with the first switch. For example, it is assumed that the second proxy actually matches the first proxy. When receiving the first packet processing inquiry message, the controller 1520 may recognize that a packet in the first packet processing inquiry message which is transmitted from a source has passed through the first switch. Subsequently, the controller 1520 may or may not already have information regarding a switch through which the packet passed on the way to its destination. Accordingly, in response to the first packet processing inquiry message, the controller 1520 may or may not determine whether the second proxy matches the first proxy.

When it is determined that there is a second proxy, the controller 1520 may instruct the first switch to transmit the packet such that the packet passes through the first proxy. For example, for this instruction, the controller 1520 may transmit an encoded message (e.g., Packet_Out message) to the first switch, and the encoded message may include the packet and also an instruction to transmit the packet via the first proxy. In particular, the encoded message may be a response to the first packet processing inquiry message.

In addition, the controller 1520 may instruct the first switch to transmit a flow associated with the packet such that the flow passes through the first proxy. For example, the controller 1520 may transmit a flow entry for indicating the instruction to the first switch. Subsequently, the first switch may add the flow entry to its own flow table.

Furthermore, the controller 1520 may instruct the second switch to transmit the packet such that the packet passes through the second proxy. For example, for this instruction, the controller 1520 may transmit an encoded message (e.g., Packet_Out message) to the second switch, and the encoded message may include the packet and also an instruction to transmit the packet such that the packet passes through the second proxy. In particular, the encoded message may be a response to the second packet processing inquiry message.

Additionally, the controller 1520 may instruct the second switch to transmit a flow associated with the packet such that the flow passes through the second proxy. For example, the controller 1520 may transmit a flow entry for indicating the instruction to the second switch. Subsequently, the second switch may add the flow entry to its own flow table.

When it is determined that there is no second proxy, the controller 1520 may instruct the first switch to transmit the packet such that the packet bypasses the first proxy. For example, for this instruction, the controller 1520 may transmit an encoded message (e.g., Packet_Out message) to the first switch, and the encoded message may include the packet and also an instruction to transmit the packet such that the packet bypasses the first proxy. In particular, the encoded message may be a response to the first packet processing inquiry message.

In addition, the controller 1520 may instruct the first switch to transmit a flow associated with the packet such that the flow bypasses the first proxy. For example, the controller 1520 may transmit a flow entry for indicating the instruction to the first switch. Subsequently, the first switch may add the flow entry to its own flow table.

Furthermore, the controller 1520 may instruct the second switch to transmit the packet such that the packet bypasses the second proxy although the second proxy is present. For example, for this instruction, the controller 1520 may transmit an encoded message (e.g., Packet_Out message) to the second switch, and the encoded message may include the packet and also an instruction to transmit the packet such that the packet bypasses the second proxy. In particular, the encoded message may be a response to the second packet processing inquiry message.

Additionally, the controller 1520 may instruct the second switch to transmit a flow associated with the packet such that the flow bypasses the second proxy although the second proxy is present. For example, the controller 1520 may transmit a flow entry for indicating the instruction to the second switch. Subsequently, the second switch may add the flow entry to its own flow table.

After the message receiver 1510 receives the second packet processing inquiry message, the controller 1520 may determine whether a packet having the same source and the same destination as those of the packet included in the first packet processing inquiry message is included in the second packet processing inquiry message. When the packets having the same source and the same destination are included in both the first packet processing inquiry message and the second packet processing inquiry message, the controller 1520 may make a subsequent determination on whether the second proxy is present.

Alternatively, the controller 1520 may calculate a hash value using at least one of an ID of the first switch and an ID of the second switch, a source address of the packet in the first packet processing inquiry message, and a destination address of the packet in the first packet processing inquiry message. The controller 1520 may insert the calculated hash value into the packet, include the corrected packet in the encoded message, which is a response to the first packet processing inquiry message, and then transmit this message to the first switch. Subsequently, the packet into which the hash value is inserted may be transported from the first switch to the second switch. In this case, after the message receiver 1510 receives the second packet processing inquiry message, the controller 1520 may determine whether the above hash value is included in the second packet processing inquiry message. When the hash value is included in the second packet processing inquiry message, the controller 1520 may make a subsequent determination on whether the second proxy is present. As mentioned above, this example may be suitable for a case in which a NAT apparatus is disposed in the SDN environment.

When a result of the above subsequent determination is that the second proxy is present, the controller 1520 may instruct the first switch to transmit another flow following the flow associated with the packet such that the subsequent flow passes through the first proxy. For example, the controller 1520 may transmit a flow entry for indicating the instruction to the first switch. Subsequently, the first switch may add the flow entry to its own flow table. Likewise, the controller 1520 may instruct the second switch to transmit the subsequent flow such that the subsequent flow passes through the second proxy. For example, the controller 1520 may transmit a flow entry for indicating the instruction to the second switch. Subsequently, the second switch may add the flow entry to its own flow table.

Embodiments of the present disclosure may include a computer-readable storage medium including a program for performing methods described in this specification on a computer. The computer-readable storage medium may include a program instruction, a local data file, a local data structure, or a combination thereof. The computer-readable storage medium may be designed and configured only for the present disclosure. Examples of the computer-readable storage medium include a magnetic medium, such as a hard disk, a floppy disk, and a magnetic tape, an optical recording medium, such as a compact disc read-only-memory (CD-ROM) and a digital versatile disc (DVD), a magneto-optical medium, such as a floptical disk, and a hardware device specially configured to store and perform a program instruction, such as a ROM, a random access memory (RAM), and a flash memory. Examples of the program instruction include a high-level language code executable by a computer with an interpreter, in addition to a machine language code made by a compiler.

According to exemplary embodiments, proxy discovery that can reduce a redundant task of a proxy in an SDN environment and shorten an initial latency is provided.

According to exemplary embodiments, when there paired proxies are not present or when transport acceleration using a proxy is not applied to a flow, the proxy may not perform unnecessary processing, thus reducing its load.

According to exemplary embodiments, efficiently proxy discovery may be performed irrespective of a NAT arrangement in an SDN environment.

Although exemplary embodiments of the disclosure has been described in detail, it will be understood by those skilled in the art that various changes may be made without departing from the spirit or scope of the disclosure. Thus, the scope of the present disclosure is to be determined by the following claims and their equivalents, and shall not be restricted or limited by the foregoing detailed description.

What is claimed is:

1. An apparatus for performing flow control in a software defined network (SDN) environment, the apparatus comprising:
   a receiver configured to receive a first packet processing inquiry message comprising a first packet from a first switch; and
   a controller configured to determine whether there is a second proxy connected with a second switch and matching a first proxy connected with the first switch in response to the first packet processing inquiry message,
   wherein the controller is further configured to, in response to determining that there is a second proxy, instruct the first switch to transmit the first packet such that the first packet passes through the first proxy, and configured to, in response to determining that there is no second proxy, instruct the first switch to transmit the first packet such that the first packet bypasses the first proxy, wherein, the receiver is further configured to receive, from the second switch, a second packet processing inquiry message following the first packet processing inquiry message, and in response to the second packet processing inquiry message comprising a hash value or a second packet having a same source and a same destination as the first packet, the controller is further configured to make a subsequent determination on whether the second proxy is present.

2. The apparatus of claim 1, wherein the controller is further configured to, in response to determining that there is no second proxy, instruct the first switch to transmit a flow associated with the first packet such that the flow bypasses the first proxy.

3. The apparatus of claim 1, wherein, when the controller determines that there is no second proxy, the controller is further configured to instruct the second switch to transmit the first packet such that the first packet bypasses the second proxy although the second proxy actually exists.

4. The apparatus of claim 1, wherein, when the controller determines that there is no second proxy, the controller is further configured to instruct the second switch to transmit a flow associated with the first packet such that the flow bypasses the second proxy although the second proxy actually exists.

5. The apparatus of claim 1, wherein, the controller is further configured to calculate the hash value using at least one from among an identifier of the first switch and an identifier of the first proxy, a source address of the first packet, and a destination address of the first packet, and to transmit the hash value to the first switch.

6. The apparatus of claim 1, wherein, in response to the subsequent determination that the second proxy is present, the controller is further configured to instruct the first switch to transmit another flow following the flow associated with the first packet such that the another flow passes through the first proxy, and in response to the subsequent determination that the second proxy is present, the controller configured to instruct the second switch to transmit the another flow such that the another flow passes through the second proxy.

7. The apparatus of claim 1, wherein when the controller determines that there is a second proxy, the controller is further configured to instruct the first switch to transmit a flow associated with the first packet such that the flow passes through the first proxy.

8. The apparatus of claim 1, wherein when the controller determines that there is a second proxy, the controller is further configured to instruct the second switch to transmit the first packet such that the first packet passes through the second proxy.

9. The apparatus of claim 1, wherein when the controller determines that there is a second proxy, the controller is further configured to instruct the second switch to transmit a flow associated with the first packet such that the flow passes through the second proxy.

10. The apparatus of claim 1, wherein, when the first packet is transmitted from a client to a server, the first switch is a client-side switch, and the second switch is a server-side switch, and when the first packet is transmitted from the server to the client, the first switch is a server-side switch, and the second switch is a client-side switch.

11. The apparatus of claim 1, wherein each of the first switch, the second switch, the first proxy, and the second proxy is configured to be driven on a virtual machine.

12. A method of performing flow control in a software defined network (SDN) environment, the method comprising:

receiving a first packet processing inquiry message comprising a first packet from a first switch;

determining whether there is a second proxy connected with a second switch and matching a first proxy connected with the first switch in response to the first packet processing inquiry message;

instructing, in response to determining that there is a second proxy, the first switch to transmit the first packet such that the first packet passes through the first proxy;

instructing, in response to determining that there is no second proxy, the first switch to transmit the first packet such that the first packet bypasses the first proxy;

receiving a second packet processing inquiry message following the first packet processing inquiry message from the second switch; and in response to the second packet processing inquiry message comprising a hash value or a second packet having a same source and a same destination as the first packet, making a subsequent determination on whether the second proxy is present.

13. The method of claim 12, further comprising, in response to determining that there is no second proxy, instructing the first switch to transmit a flow associated with the first packet such that the flow bypasses the first proxy.

14. The method of claim 12, further comprising, in response to determining that there is no second proxy, instructing the second switch to transmit the first packet such that the first packet bypasses the second proxy although the second proxy actually exists.

15. The method of claim 12, further comprising, in response to determining that there is no second proxy, instructing the second switch to transmit a flow associated with the first packet such that the flow bypasses the second proxy although the second proxy actually exists.

16. The method of claim 12, further comprising calculating the hash value using at least one from among an identifier (ID) of the first switch and an ID of the first proxy, a source address of the first packet, and a destination address of the first packet; and transmitting the hash value to the first switch.

17. The method of claim 12, further comprising:

in response to the subsequent determination determining that the second proxy is present, instructing the first switch to transmit another flow following the flow associated with the first packet such that the another flow passes through the first proxy; and in response to the subsequent determination determining that the second proxy is present, instructing the second switch to transmit the another flow such that the another flow passes through the second proxy.

18. The method of claim 12, further comprising, in response to the determining determining that there is a second proxy, instructing the first switch to transmit a flow associated with the first packet such that the flow passes through the first proxy.

19. The method of claim 12, further comprising, in response to the determining determining that there is a second proxy, instructing the second switch to transmit the first packet such that the first packet passes through the second proxy.

20. The method of claim 12, further comprising, in response to the determining determining that there is a second proxy, instructing the second switch to transmit a flow associated with the first packet such that the flow passes through the second proxy.

21. The method of claim 12, wherein,
when the first packet is transmitted from a client to a server, the first switch is a client-side switch, and the second switch is a server-side switch, and
when the first packet is transmitted from the server to the client, the first switch is a server-side switch, and the second switch is a client-side switch.

22. The method of claim 12, wherein each of the first switch, the second switch, the first proxy, and the second proxy is driven on a virtual machine.

23. A non-transitory computer-readable medium storing a program when executed by a processor to make a computer execute the method according to claim 12.

* * * * *